(12) United States Patent
Han et al.

(10) Patent No.: US 9,721,151 B2
(45) Date of Patent: Aug. 1, 2017

(54) METHOD AND APPARATUS FOR DETECTING INTERFACING REGION IN DEPTH IMAGE

(71) Applicant: Samsung Electronics Co., Ltd., Suwon-si (KR)

(72) Inventors: Seung Ju Han, Seoul (KR); Jae Joon Han, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 263 days.

(21) Appl. No.: 14/302,908

(22) Filed: Jun. 12, 2014

(65) Prior Publication Data
US 2015/0022441 A1    Jan. 22, 2015

(30) Foreign Application Priority Data
Jul. 16, 2013  (KR) .................. 10-2013-0083271

(51) Int. Cl.
*G06K 9/00* (2006.01)
*G06K 9/34* (2006.01)
*G06T 7/254* (2017.01)

(52) U.S. Cl.
CPC ..... *G06K 9/00335* (2013.01); *G06K 9/00201* (2013.01); *G06K 9/00362* (2013.01); *G06K 9/342* (2013.01); *G06T 7/254* (2017.01); *G06T 2207/10028* (2013.01); *G06T 2207/20072* (2013.01); *G06T 2207/30196* (2013.01)

(58) Field of Classification Search
CPC .......... G06K 9/00335; G06K 9/00201; G06K 9/342; G06T 7/2053; G06T 2207/10028; G06T 2207/30196
USPC .................................. 345/156–167
See application file for complete search history.

(56) References Cited

U.S. PATENT DOCUMENTS

| 8,249,334 B2* | 8/2012 | Berliner ............ G06K 9/00362 345/419 |
| 2010/0103311 A1* | 4/2010 | Makii .................. G06T 7/0057 348/369 |
| 2012/0089949 A1 | 4/2012 | Chen et al. |
| 2014/0270352 A1* | 9/2014 | Fujimura ................. G06K 9/44 382/103 |

FOREIGN PATENT DOCUMENTS

| JP | 2008-165705 | 7/2008 |
| JP | 2012-3358 | 1/2012 |
| JP | 2012-226745 | 11/2012 |
| KR | 10-2011-0040312 | 4/2011 |
| KR | 10-2013-0043394 | 4/2013 |

* cited by examiner

*Primary Examiner* — Michael Pervan
(74) *Attorney, Agent, or Firm* — NSIP Law

(57) ABSTRACT

An apparatus for detecting an interfacing region in a depth image detects the interfacing region based on a depth of a first region and a depth of a second region which is an external region of the first region in a depth image.

22 Claims, 14 Drawing Sheets

METHOD AND APPARATUS FOR DETECTING INTERFACING REGION IN DEPTH IMAGE

CROSS-REFERENCE TO RELATED APPLICATIONS

This application claims the priority benefit of Korean Patent Application No. 10-2013-0083271, filed on Jul. 16, 2013, in the Korean Intellectual Property Office, the disclosure of which is incorporated herein by reference.

BACKGROUND

1. Field

The following description relates to a user interfacing scheme using a depth image.

2. Description of the Related Art

A natural user interface technology refers to a user input processing scheme based on a natural motion of a user. For example, the natural user interface technology ensures various forms of inputs, such as controlling a volume or selecting content, using a hand motion without operating a remote controller in front of a smart television.

SUMMARY

The foregoing and/or other aspects are achieved by providing a method of detecting a user input, the method including comparing, in a depth image, a depth of a first region to a depth of a second region which is an external region of the first region, and classifying at least one point included in the first region as an interfacing region based on a depth difference between the depth of the first region and the depth of the second region.

The classifying may include determining whether a ratio of points, among a plurality of points included in the first region, having depths less than the depth of the second region by at least a threshold depth difference to the plurality of points included in the first region is greater than a threshold ratio. Also, the classifying may include classifying a central point of the first region as the interfacing region.

The method of detecting a user input may further include selecting one of a plurality of points included in the depth image, and setting the first region and the second region at the selected point.

The method of detecting a user input may further include detecting an end-point of an object included in the depth image, and setting the first region and the second region at the detected end-point.

The detecting may include calculating a center of the object included in the depth image, calculating distance information among a plurality of points included in the object based on the center of the object, and detecting the end-point based on the distance information.

The foregoing and/or other aspects are achieved by providing an apparatus for detecting a user input, the apparatus including a comparator to compare, in a depth image, a depth of a first region to a depth of a second region which is an external region of the first region, and a classifier to classify at least one point included in the first region as an interfacing region based on a depth difference between the depth of the first region and the depth of the second region.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
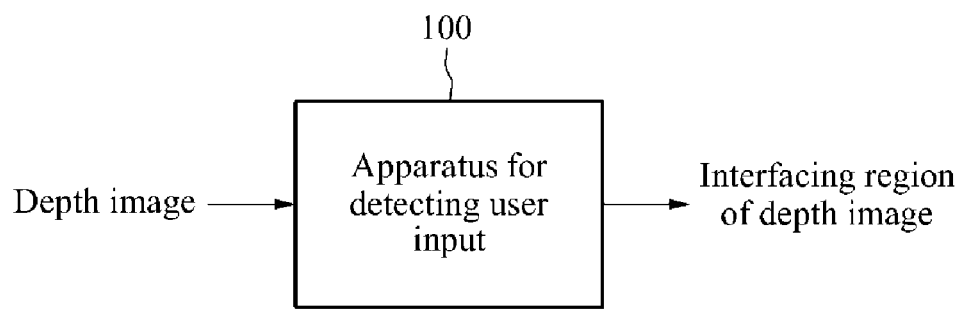
FIG. 1 illustrates an apparatus for detecting a user input according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an apparatus 100 for detecting a user input according to example embodiments.

Referring to FIG. 1, the apparatus 100 for detecting a user input according to example embodiments may receive a depth image and detect an interfacing region from the received depth image. A depth image may correspond to an image containing depth information, such as depth information relating to distances of scene objects from a viewpoint of a time-of flight depth camera, for example. In contrast to a color image, which may merely provide a perception of image depth to a viewer of the image, a depth image may contain actual depth information, which may be translated into grayscale color information, such as by creating an image in which luminance is in proportion to the distance from the camera, for example.

The interfacing region may refer to a region corresponding to a user input of an object included in the depth image. For example, the interfacing region may include a region including a hand of a user.

The apparatus 100 for detecting a user input may receive a depth image capturing a body of a user as a whole or a portion of the body thereof. In this instance, the apparatus 100 for detecting a user input may detect a region including a hand of a user from the depth image capturing the body of a user as a whole or a portion of the body thereof.

The apparatus 100 for detecting a user input may output a depth image corresponding to the detected interfacing region.

Figure 2:
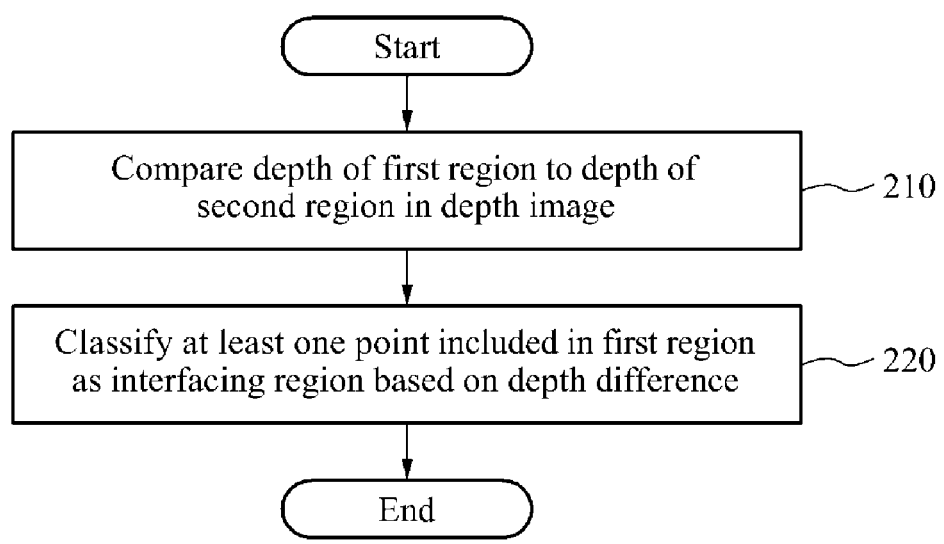
FIG. 2 illustrates a method of detecting a user input according to example embodiments.

FIG. 2 illustrates a method of detecting a user input according to example embodiments.

Referring to FIG. 2, the method of detecting a user input according to example embodiments may include comparing a depth of a first region to a depth of a second region in a depth image (operation 210), and classifying at least one point included in the first region as an interfacing region, based on a depth difference between the depth of the first region and the depth of the second region (operation 220).

Figure 3:
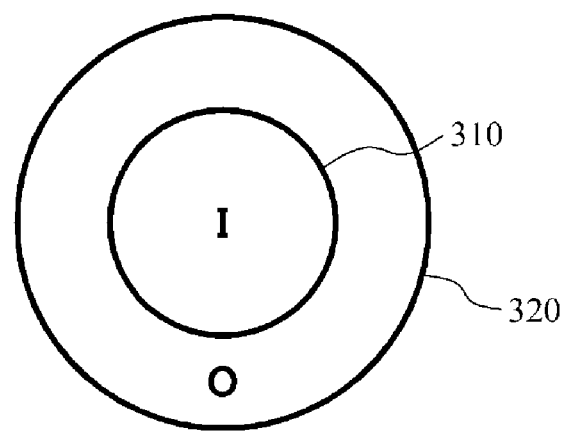
FIG. 3 illustrates a first region and a second region according to example embodiments.

The second region may be an external region of the first region. Referring to FIG. 3, for example, a first region 310 may include a predetermined-sized circular region and a second region 320 may include a doughnut-shaped region surrounding the first region 310.

The shapes of the first region and the second region may be transformed in various manners, and are not limited to shapes such as a circle or a doughnut. For example, a boundary line of the first region may be set to be the second region.

For convenience and ease of description, it is assumed that a user located in front of an image sensor capturing a depth image poses for a user input using both hands. In this instance, both hands of the user may be located closer to the image sensor, in comparison to other body parts.

When the first region is located on one of the hands of the user, the second region, which is an external region of the first region, may include other body parts, such as an arm of the user, for example, of a body visible around the hand of the user from a viewpoint of the image sensor.

The hand of the user may be located closer to the image sensor, in comparison to other body parts, such as the arm of the user, for example, included in the second region. Thus, when a distance between the image sensor and the second region is longer than, or greater than, a distance between the image sensor and the first region, the first region may be detected to be a region including a hand of a user.

Hereinafter, the distance between the image sensor and the second region may be expressed using a metric, such as "depth", for example. In this instance, when a depth from the image sensor to the second region is more than a depth from the image sensor to the first region, such that the first image region is closer to the image sensor than the second region, the first region may be detected to be the user hand region.

Figure 4:
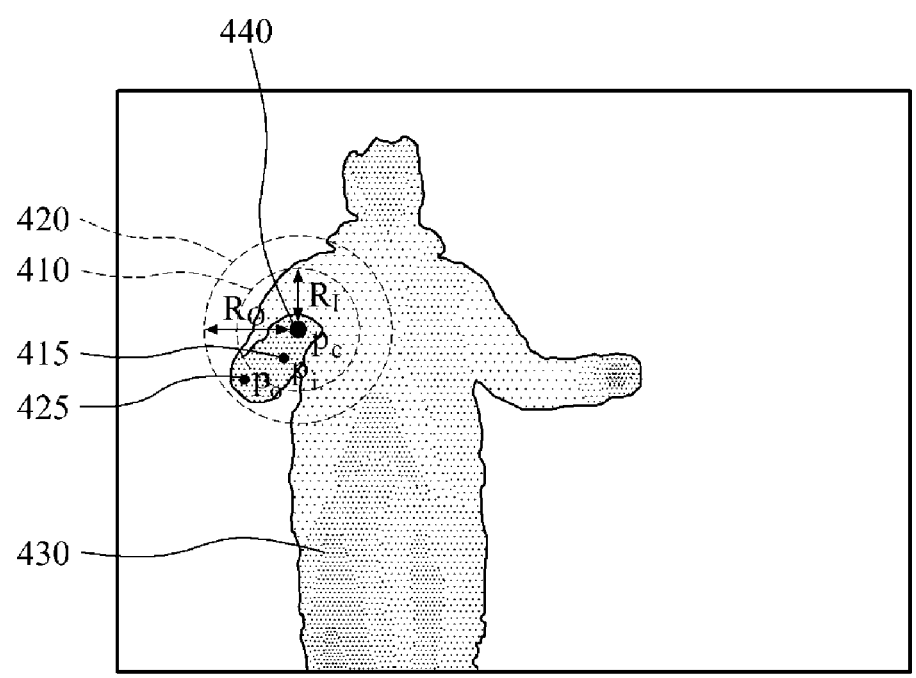
FIG. 4 illustrates a method of detecting a user input using a first region and a second region according to example embodiments.

Referring to FIG. 4, a depth image may include a plurality of points corresponding to a full body 430 of a user. According to example embodiments, a plurality of points corresponding to a hand of the user may be detected from among the plurality of points corresponding to the full body 430 of the user by performing a scan using a first region 410 and a second region 420. For example, when the first region 410 is disposed on a right hand of the user, a central point pc 440 of the first region 410 may be classified as an interfacing region.

In a process of performing the scan using the first region 410 and the second region 420, the first region 410 and the second region 420 may be disposed based on the central point pc 440 located on the right hand of the user. The first region 410 may correspond to a circular region with a radius RI, and the second region 420 may correspond to a doughnut-shaped region with an external radius RO and an internal radius RI.

When the user is making a motion for a user input using the right hand, the right hand of the user may be located closer to the image sensor in comparison to other body parts of the user. For example, a depth of a first point pi 415 included in the first region 410 is less than a depth of a second point po 425 included in the second region 420.

Thus, the central point pc 440 of the first region 410 may be classified as the interfacing region.

Through repetition of the aforementioned operation, the plurality of points corresponding to the right hand of the user may be detected from among the plurality of points corresponding to the full body 430 of the user. When the user poses for a user input using both hands, a plurality of points corresponding to a left hand of the user and a plurality of points corresponding to the right hand of the user may be detected.

The depth of the first region may be calculated using points corresponding to an object included in the depth image among the plurality of points included in the first region. For example, points corresponding to a user body among the plurality of points included in the first region may be used, whereas points corresponding to noise, such as a background, for example, may not be used.

The depth of the second region may be calculated using points corresponding to the object included in the depth image among a plurality of points included in the second region. For example, points corresponding to the user body among the plurality of points included in the second region may be used, whereas points corresponding to noise, such as a background, for example, may not be used.

The depth of the second region may include a minimum depth among depths of the plurality of points included in the second region. In this instance, each depth of the plurality of points included in the first region may be compared to the minimum depth of the second region.

Among the plurality of points included in the first region, when a number of points having depths less than the depth of the second region by at least a threshold depth is greater than or equal to a predetermined value, at least one point included in the first region may be classified as the interfacing region.

According to example embodiments, when the interfacing region is detected, a user input may be sensed using the detected interfacing region. For example, when regions corresponding to both hands of a user are detected to be the interfacing region, the user input may be sensed by applying a motion recognition scheme to the detected region.

Figure 5:
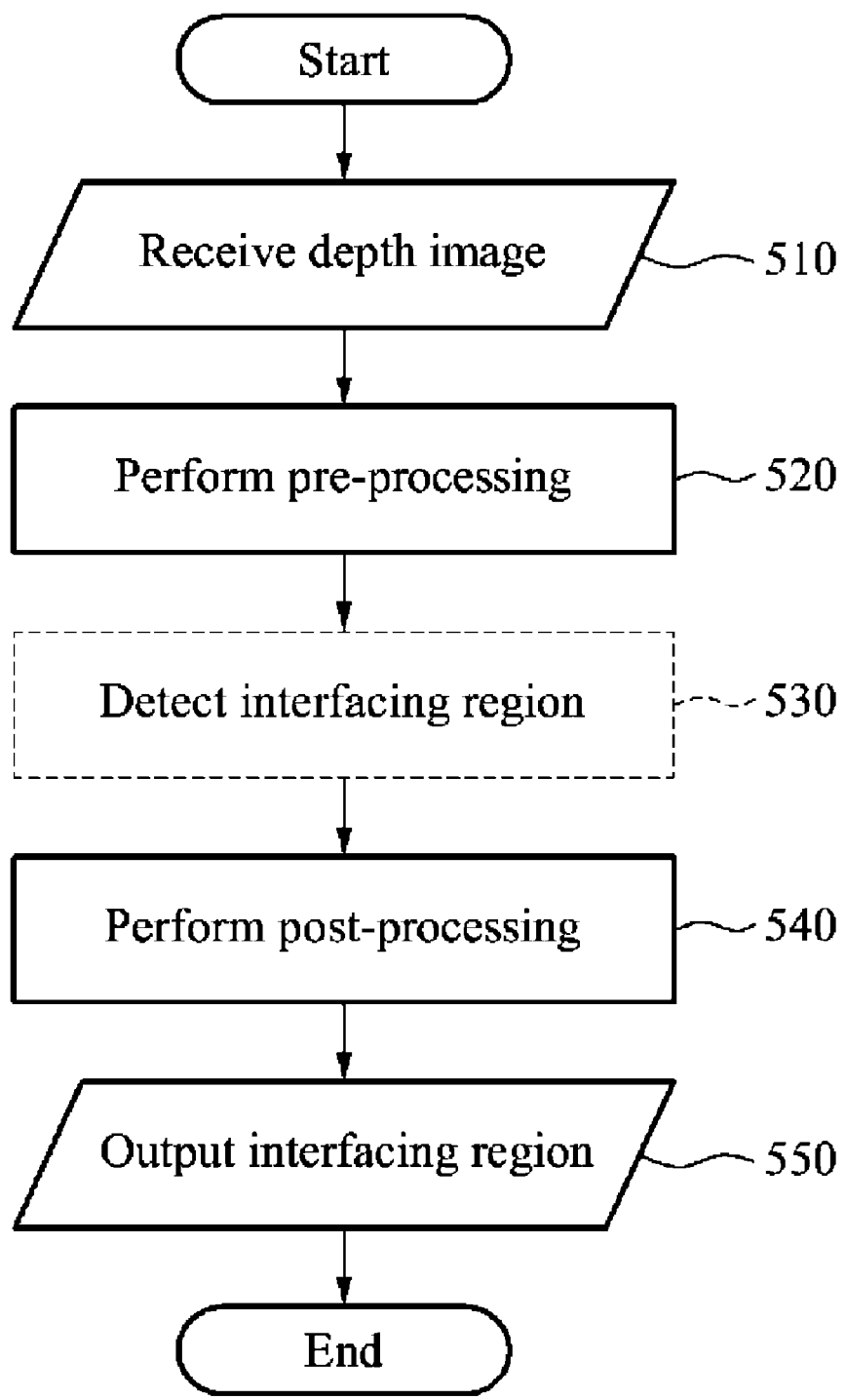
FIGS. 5 and 6 illustrate a method of detecting an interfacing region through performing a scan according to example embodiments.
Figure 6:
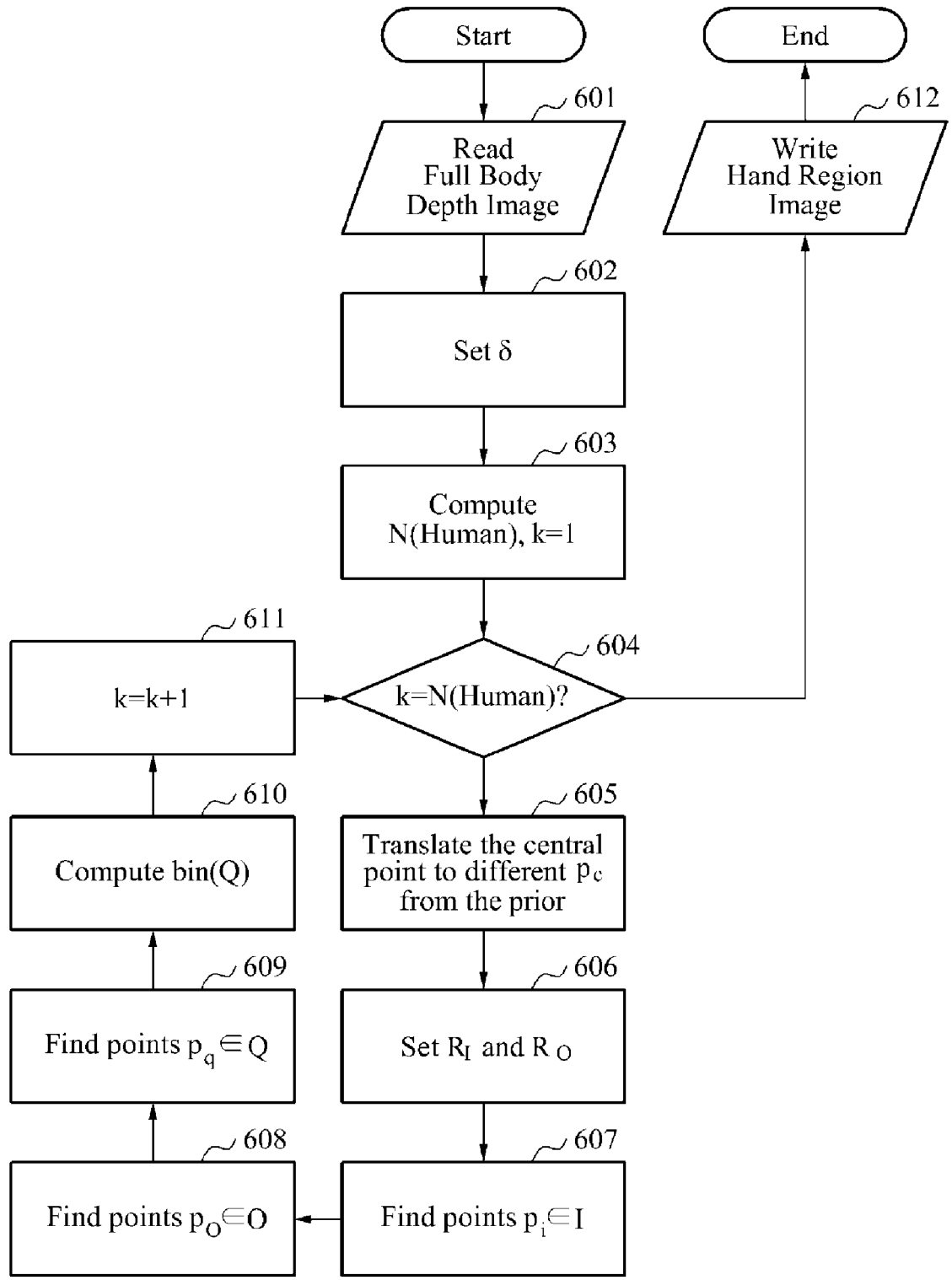

FIGS. 5 and 6 illustrate a method of detecting an interfacing region by performing a scan according to example embodiments.

Referring to FIG. 5, in operation 510, an apparatus for detecting a user input according to example embodiments may receive a depth image. Here, the depth image may include a full body of a user. However, the depth image is not limited thereto. For example, the depth image may include a portion of a body of a user.

In operation 520, the apparatus for detecting a user input may perform pre-processing. For example, the apparatus for detecting a user input may perform the pre-processing, including noise elimination for correcting data and resizing for improving a calculation speed, for example. The apparatus for detecting a user input may perform the resizing on a resolution of the depth image from 320×240 to 160×120, for example, thereby improving the calculation speed in subsequent operations.

In operation 530, the apparatus for detecting a user input may detect an interfacing region. The foregoing descriptions provided with reference to FIGS. 1 through 4 may be identically applied to an operation of detecting the interfacing region and thus, repeated descriptions will be omitted here for conciseness. The operation of detecting the interfacing region will be described in detail with reference to FIG. 6.

In operation 540, the apparatus for detecting a user input may perform post-processing. For example, the apparatus for detecting a user input may perform the post-processing on the depth image to restore an adjusted resolution to an original resolution.

In operation 550, the apparatus for detecting a user input may output the interfacing region. For example, the apparatus for detecting a user input may selectively output a portion of depth image, corresponding to the interfacing region, from an entire depth image.

Referring to FIG. 6, in operation 601, the apparatus for detecting a user input may receive a depth image, such as a full body depth image, for example. In operation 602, the apparatus for detecting a user input may set a threshold depth δ. In operation 603, the apparatus for detecting a user input may compute N. Here, N denotes a number of points corresponding to an object, such as a user, for example.

In operation 604, the apparatus for detecting a user input may examine iteration conditions. The apparatus for detecting a user input may translate a central point pc to a new location in operation 605. In operation 606, the apparatus for detecting a user input may set a first region RI and a second region Ro based on the translated central point pc.

In operation 607, the apparatus for detecting a user input may find points pi included in the first region RI. In operation 608, the apparatus for detecting a user input may find points $p_o$ included in the second region $R_o$.

In operation 609, the apparatus for detecting a user input may obtain a set Q using Equation 1.

$$Q = \{\forall\, p_q \in I \mid D_{min}(p_o) - D(p_q) > \delta\} \quad \text{[Equation 1]}$$

$$D_{min}(p_o) = \min_{(x,y) \in O} D(x, y)$$

Here, D(x,y) denotes a depth of a point at coordinates (x,y), and $D_{min}(p_o)$ denotes a minimum depth among a plurality of points included in a second region O. $p_q$ denotes an element of the set Q, and $p_q$ is included in a first region I. The set Q may refer to a set of points $p_q$ having values greater than the threshold depth δ, obtained by subtracting $D(p_q)$ from $D_{min}(p_o)$.

The set Q may refer to a set including a plurality of points of the first region I. Depth differences among the plurality of points of the set Q and a point having a minimum depth among the plurality of points of the second region O are greater than a predetermined value. The predetermined value may be set to be the threshold depth δ. The threshold depth δ may be a parameter for determining the plurality of points of the set Q. For example, if a depth difference between a point A of the first region I and the point having the minimum depth of the second region O is greater than the threshold depth δ, the point A may be included in the set Q.

In operation 610, the apparatus for detecting a user input may compute a ratio bin(Q) using Equation 2.

$$\text{bin}(Q) = \frac{N(Q)}{N(I)}, \quad 0 \leq \text{bin}(Q) \leq 1 \quad \text{[Equation 2]}$$

The ratio bin(Q) denotes a ratio of N(Q) to N(I). Here, N(Q) denotes a number of elements included in the set Q, and N(I) denotes a total number of points included in the first region. The ratio bin(Q) may have a value between "0" and "1". However, the disclosure is not limited thereto. An increase in the ratio bin(Q) indicates that a greater number of points included in the first region are located closer to the image sensor, in comparison to the minimum depth of the second region. In this instance, the apparatus for detecting a user input may classify the at least one point, for example, a central point of the first region, as the interfacing region.

Conversely, a decrease in the ratio bin(Q) indicates that a fewer number of points included in the first region are located closer to the image sensor, in comparison to the minimum depth of the second region. In this instance, the apparatus for detecting a user input may not classify the at least one point, for example, a central point of the first region, as the interfacing region.

In operation 611, the apparatus for detecting a user input may increase a value of a variable k for each iteration. When it is determined that all iterations are completed in operation 604, the apparatus for detecting a user input may output an image of the detected hand region in operation 612.

An interfacing region detection scheme according to example embodiments may be implemented using an algorithm as described in Table 1.

TABLE 1

1: Input a full-body depth image
2: Set depth threshold (depth difference) δ
3: for each point $p_c = (x_c, y_c) \in$ Human do
4: Translate the central point to $p_c$
5: Set $R_I$ and $R_O$
6: Find points $p_i = (x_i, y_i)$ in an inner-circle with a radius $R_I$:

$I = \{\forall p_i \mid \|p_i - p_c\| < R_I\ \&\ p_i \in \text{Human}\}$

7: Find points $p_o = (x_o, y_o)$ in a donut-circle with a radius $R_I$ and $R_O$:

$O = \{\forall p_o \mid R_I \leq \|p_o - p_c\| \leq R_O\ \&\ p_o \in \text{Human}\}$ 8: Find points $p_q$ with the depth difference δ from the minimum depth of $p_o$:

$Q = \{\forall p_q \in I \mid D_{min}(p_o) - D(p_q) > \delta\}$ $D_{min}(p_o) = \min_{(x,y) \in O} D(x, y)$ where D maps each point of the image plane to the corresponding depth measure (along the z-axis).
9: Compute the bin that correspond to $p_q$:

$\text{bin}(Q) = \frac{N(Q)}{N(I)}, 0 \leq \text{bin}(Q) \leq 1$ where N refers to the number of points.
10: end for
11: Output the hand region image FIGS. 7 and 8 illustrate a method of detecting an interfacing region by detecting an end-point according to example embodiments.

Figure 7:
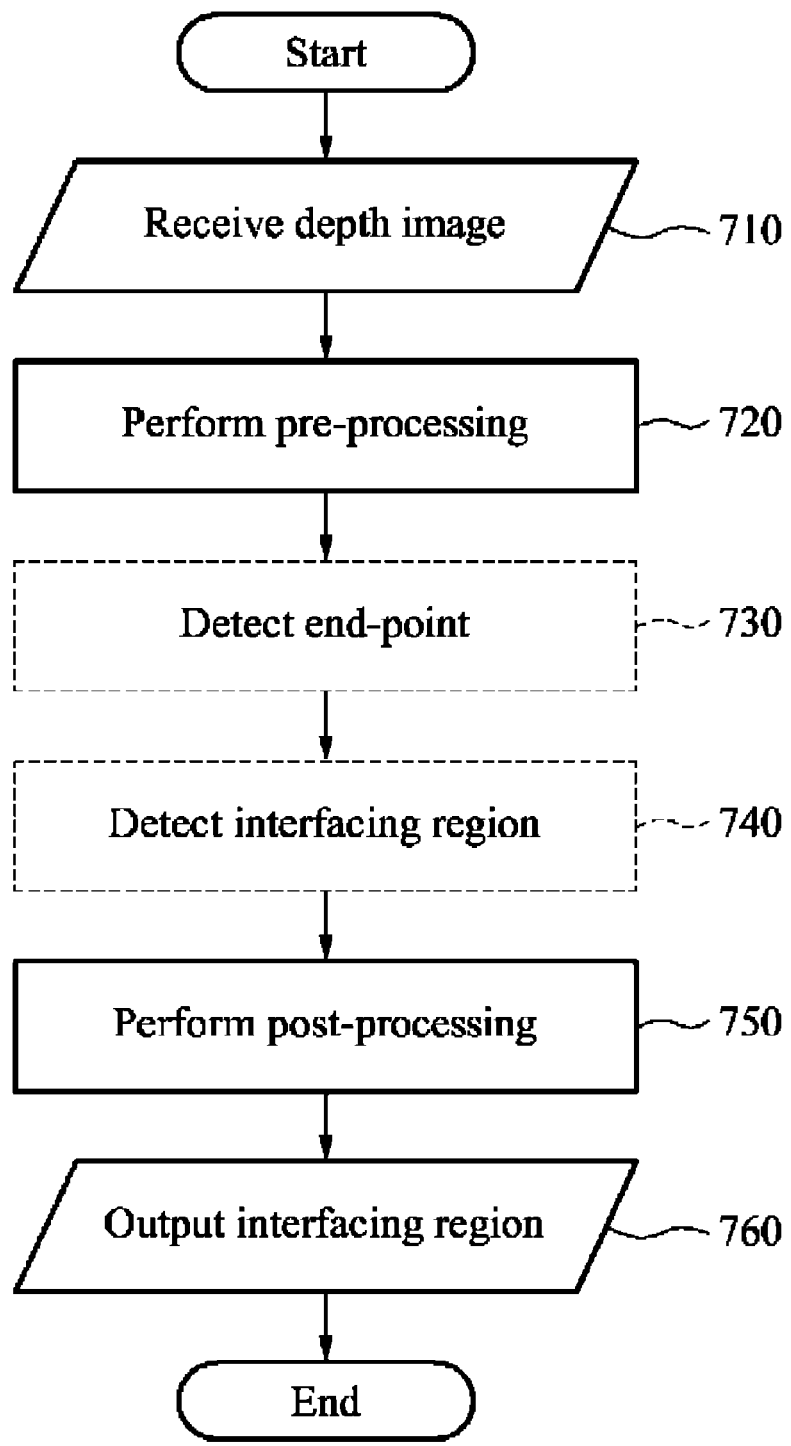
FIGS. 7 and 8 illustrate a method of detecting an interfacing region by detecting an end-point according to example embodiments.
Figure 8:
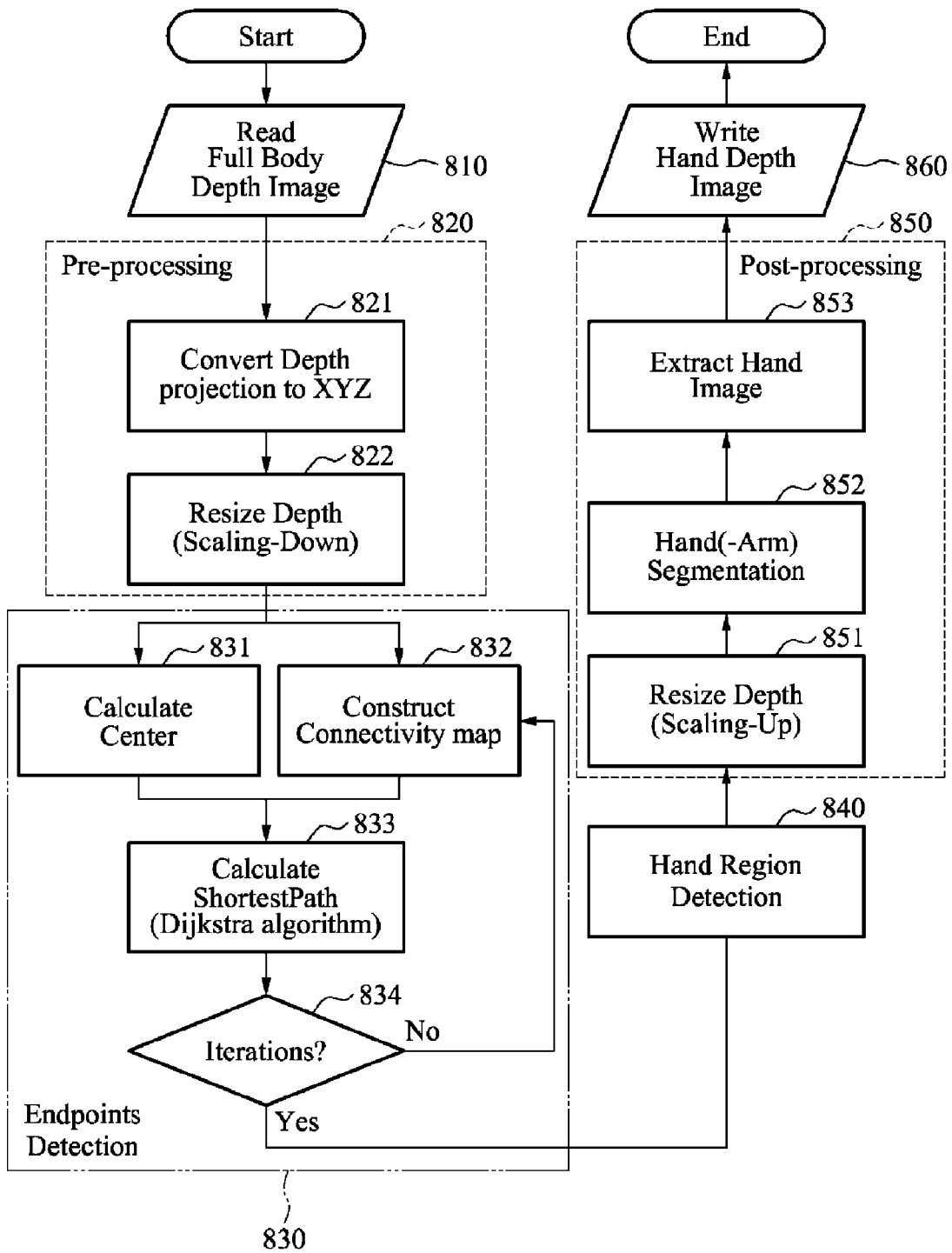

Referring to FIG. 7, in operation 710, the apparatus for detecting a user input according to example embodiments may receive a depth image. Here, the depth image may include a full body of a user.

In operation 720, the apparatus for detecting a user input may perform pre-processing. For example, the apparatus for detecting a user input may perform the pre-processing including eliminating noise for correcting data, and resizing to improve a calculation speed, for example. The apparatus for detecting a user input may perform the resizing on a resolution of the depth image from 320×240 to 160×120, thereby improving the calculation speed in subsequent operations.

In operation 730, the apparatus for detecting a user input may detect an end-point. The end-point may refer to a point having the highest possibility of corresponding to an interfacing region among a plurality of points corresponding to an object included in the depth image. For example, the end-point may include a point located at a distance farthest from a center of the object. According to example embodiments, the center of the object may correspond to an abdomen. In this instance, the end-point may include a head, both hands, and both feet, for example. An operation of detecting the end-point will be described with reference to FIG. 8.

In operation 740, the apparatus for detecting a user input may detect the interfacing region. The foregoing descriptions about FIGS. 1 through 6 may be identically applied to the operation of detecting the interfacing region and thus, further description will be omitted for conciseness.

In operation 750, the apparatus for detecting a user input may perform post-processing. For example, the apparatus for detecting a user input may perform the post-processing on the depth image to restore an adjusted resolution to an original resolution.

In operation 760, the apparatus for detecting a user input may output the interfacing region. For example, the apparatus for detecting a user input may selectively output a portion of a depth image corresponding to the interfacing region from an entire depth image.

Referring to FIG. 8, operation 810, operation 820, operation 830, operation 840, operation 850, and operation 860 may correspond to operation 710, operation 720, operation 730, operation 740, operation 750, and operation 760 of FIG. 7, respectively.

In operation 821, the apparatus for detecting a user input according to example embodiments may convert a coordinates system of a depth image from a projective coordinates system to an orthogonal coordinates system. For example, a plurality of points included in the depth image may include depth information corresponding to location of the corresponding point. The apparatus for detecting a user input may set the location of the corresponding point as (X, Y) coordinates of the orthogonal coordinates system and set a depth of the corresponding point as a Z coordinate of the orthogonal coordinates system.

In operation 822, the apparatus for detecting a user input may resize a resolution of the depth image. For example, the apparatus for detecting a user input may scale-down the resolution of the depth image to improve an operation speed in subsequent operations.

In operation 831, the apparatus for detecting a user input may calculate a center of the object included in the depth image. For example, the apparatus for detecting a user input may calculate a depth center of the object using Equation 3.

$$\text{centre\_X} = \frac{\sum X \cdot Z}{\sum Z}$$
$$\text{centre\_Y} = \frac{\sum Y \cdot Z}{\sum Z}$$

[Equation 3]

In operation 832, the apparatus for detecting a user input may construct a connectivity map. For example, the apparatus for detecting a user input may construct the connectivity map such as a left graph of FIG. 9. The connectivity map may include information associated with connectivity relationships among the plurality of points included in the depth image and information associated with connectivity distances among the plurality of points included in the depth image.

In operation 833, the apparatus for detecting a user input may detect an end-point using the connectivity map. For example, the apparatus for detecting a user input may detect the end-point located in the farthest distance from the central point calculated in operation 831.

Figure 9:
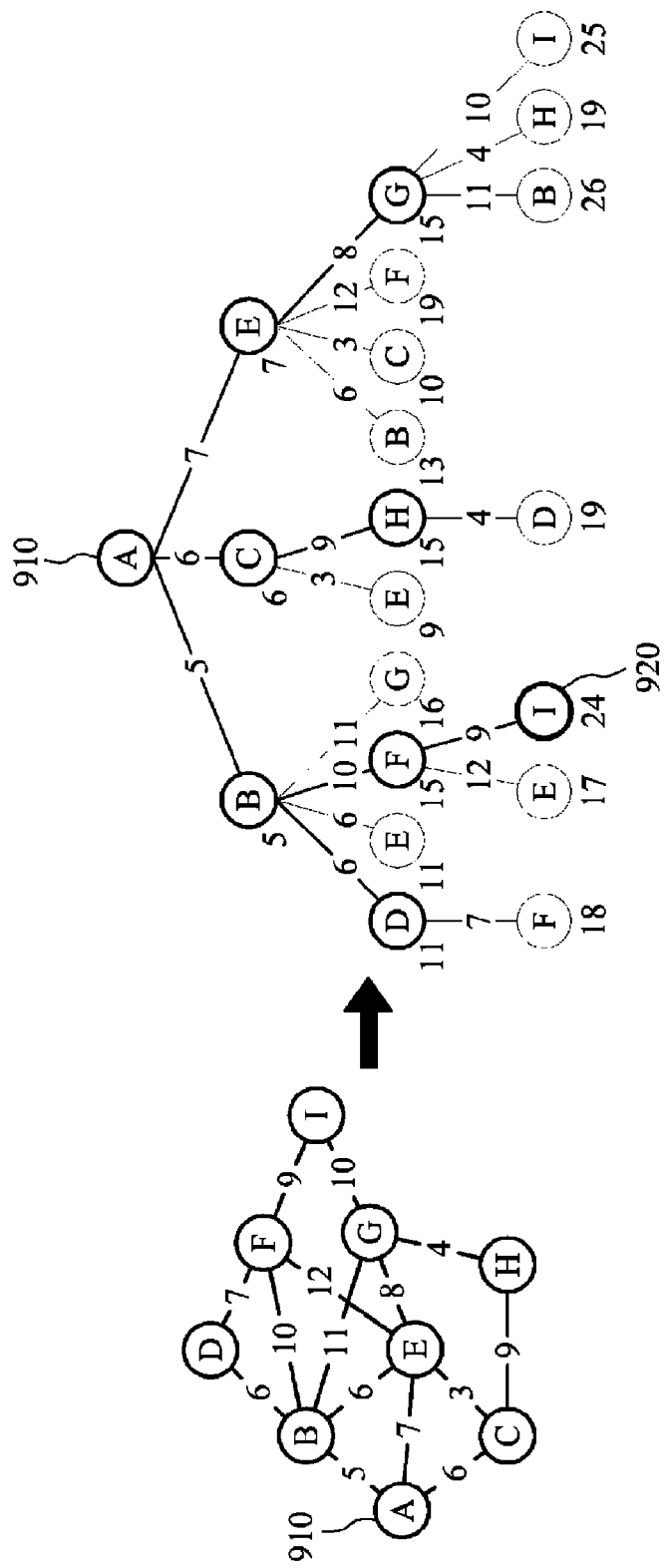
FIG. 9 illustrates detection of an end-point according to example embodiments.

The apparatus for detecting a user input may detect the end-point using an algorithm for calculating the shortest path. For example, the apparatus for detecting a user input may use a Dijkstra algorithm. In FIG. 9, the apparatus for detecting a user input may calculate the shortest paths from a central point A 910 to other points. The apparatus for detecting a user input may obtain distance information as illustrated in a right graph of FIG. 9.

Because a point I 920 is located at a distance farthest from the central point A 910, the apparatus for detecting a user input may detect the point I 920 to be the end-point.

In operation 834, the apparatus for detecting a user input may determine whether a predetermined number of end-points are detected. The apparatus for detecting a user input may detect the end-points having a number corresponding to a number of iterations.

The apparatus for detecting a user input may set a number of candidate groups of the end-points included in the depth image in advance. In particular, the apparatus for detecting a user input may set the number of iterations such that both hands of a user may be incorporated in the candidate groups of the end-points.

For example, when the apparatus for detecting a user input receives the depth image capturing a full body of the user, the end-point may include a head, both hands, and both feet. In this instance, the apparatus for detecting a user input may set the number of iterations as "5" to detect the both hands. Depending on cases, other parts of the body may be detected to be the end-point in lieu of the head, the both hands, and the both feet. Thus, the apparatus for detecting a user input may set the number of iterations to be a value greater than "5".

Alternatively, when the apparatus for detecting a user input receives the depth image capturing an upper half of body, the end-point may include the head and the both hands. In this instance, the apparatus for detecting a user input may set the number of iterations as "3" to detect the both hands. Depending on cases, the other parts of the body may be detected to be the end-point in lieu of the head, and both hands. Thus, the apparatus for detecting a user input may set the number of iterations to be a value greater than "3".

When a single end-point is detected, the apparatus for detecting a user input may set a distance between the detected end-point and the central point as "0". Accordingly, the apparatus for detecting a user input may prevent points located around the detected end-point from being detected as a subsequent end-point.

In operation 840, the apparatus for detecting a user input may detect an interfacing region, for example, a hand region. The apparatus for detecting a user input may apply the interfacing region detection scheme to the end-points detected in operation 830 rather than applying the interfacing region detection scheme to all of the plurality of points included in the depth image.

Depending on cases, the apparatus for detecting a user input may apply the interfacing region detection scheme to regions located around the detected end-point. The interfacing region detection scheme refers to a scheme of detecting the interfacing region using a depth difference between a first region and a second region. Descriptions provided with reference to FIGS. 1 through 7 may be identically applied to the interfacing region detection scheme and thus, repeated descriptions will be omitted here for conciseness.

In operation 851, the apparatus for detecting a user input may restore the resized resolution of the depth image. For example, the apparatus for detecting a user input may scale-up the resolution of the depth image.

In operation 852, the apparatus for detecting a user input may perform segmentation. For example, the apparatus for detecting a user input may distinguish the hand region and an arm region. In operation 853, the apparatus for detecting a user input may extract the hand region.

Figure 10:
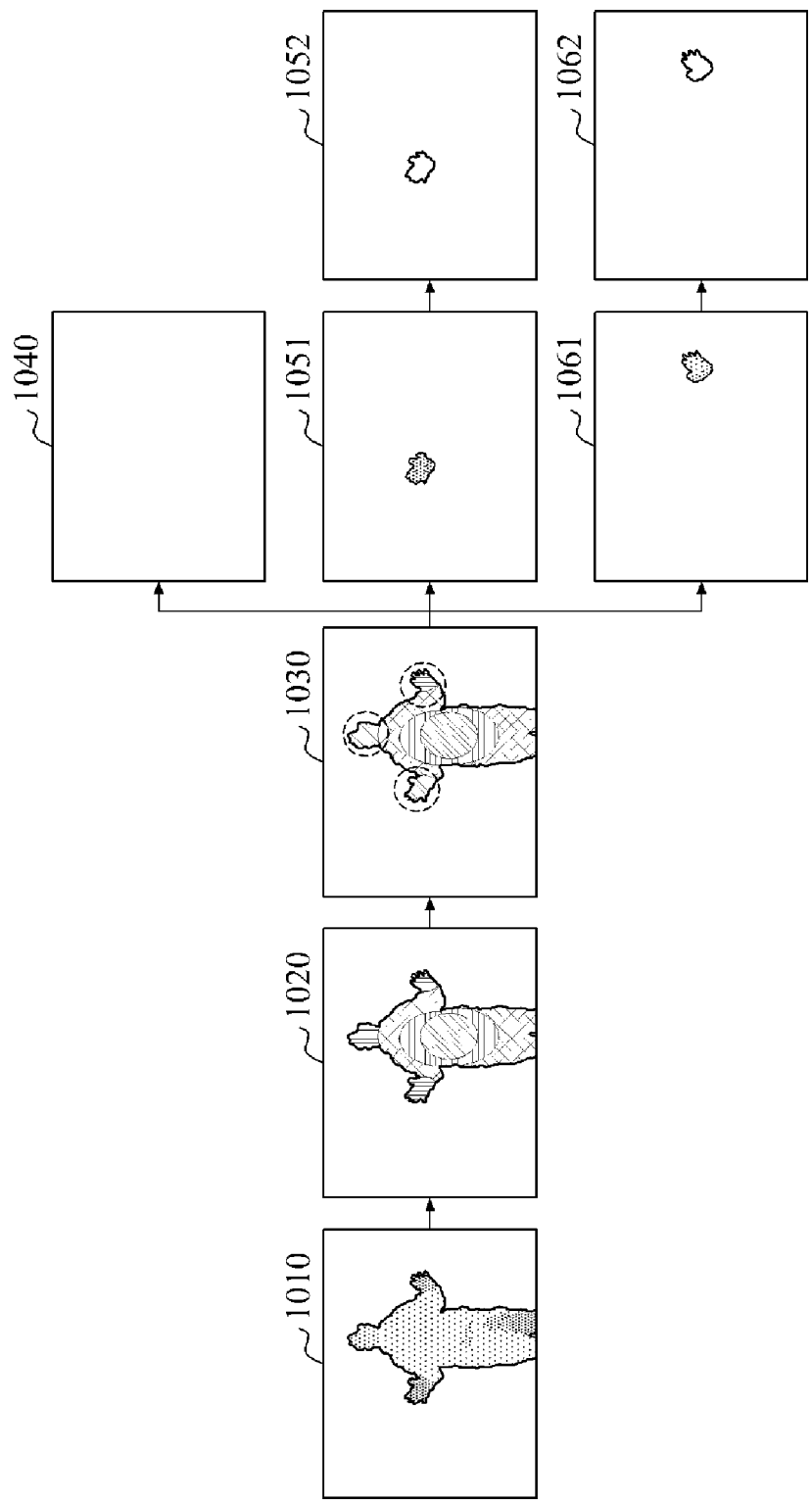
FIG. 10 illustrates a process of detecting a hand region from a depth image according to example embodiments.

FIG. 10 illustrates a process of detecting a hand region from a depth image according to example embodiments.

Referring to FIG. 10, the apparatus for detecting a user input according to example embodiments may receive a depth image 1010 capturing a full body of a user. The apparatus for detecting a user input may generate a distance information image 1020 including distance information associated with a distance from a center of an object included in the depth image 1010.

The apparatus for detecting a user input may detect end-point regions using the distance information image 1020, as illustrated in image 1030, for example. For example, because a head and both hands are detected at a distance farthest from an abdomen corresponding to the center of the object, the apparatus for detecting a user input may detect a head region, a left hand region, and a right hand region to be end-points.

The apparatus for detecting a user input may apply an interfacing region detection scheme to each of the head region, the left hand region, and the right hand region. In a case of the head region, an image 1040 in which the interfacing region is not detected may be derived. A principle of the head region not being detected to be the interfacing region will be described with reference to FIG. 13.

The left hand region and the right hand region may be detected to be the interfacing region. An image 1051 and an image 1061 may be also derived from the left hand region and the right hand region. A principle of the left hand region and the right hand region being detected to be the interfacing region will be described with reference to FIGS. 11 and 12.

The apparatus for detecting a user input may acquire the depth image corresponding to a hand of a user using the interfacing region. For example, an image 1052 and an image 1062 may be derived.

Figure 11:
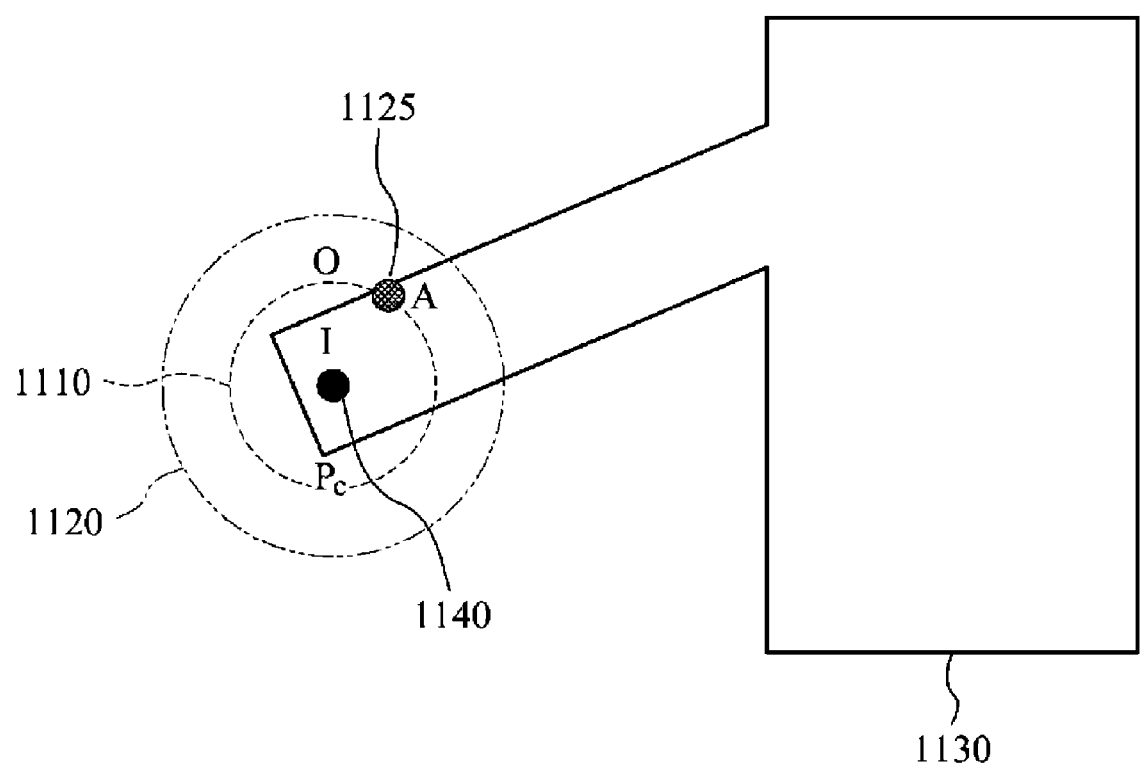
FIGS. 11 through 13 illustrate principles of a method of detecting a user input according to example embodiments.
Figure 12:
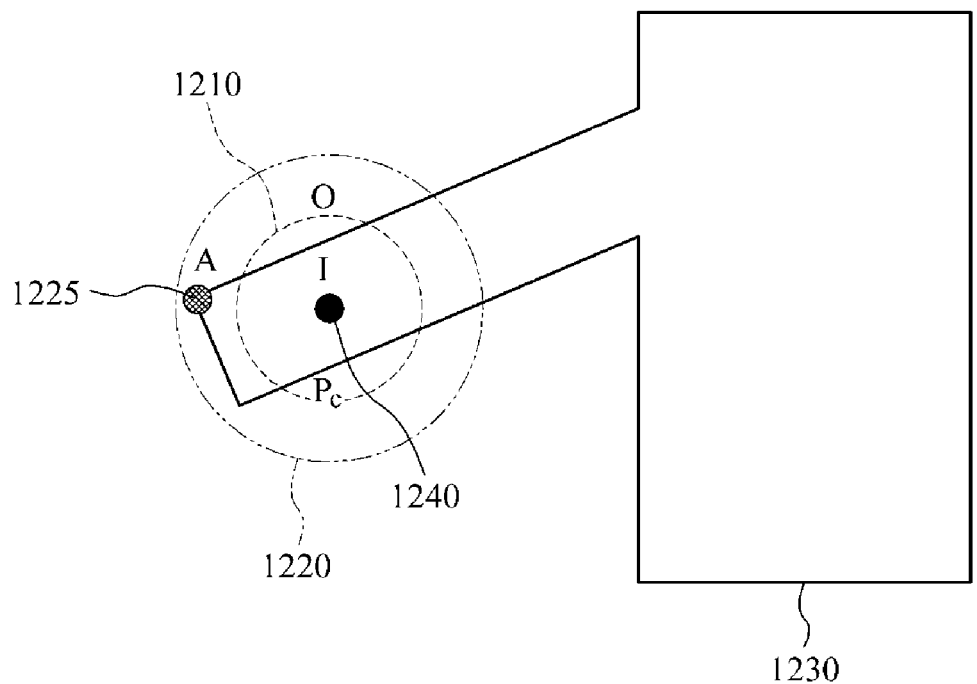
Figure 13:
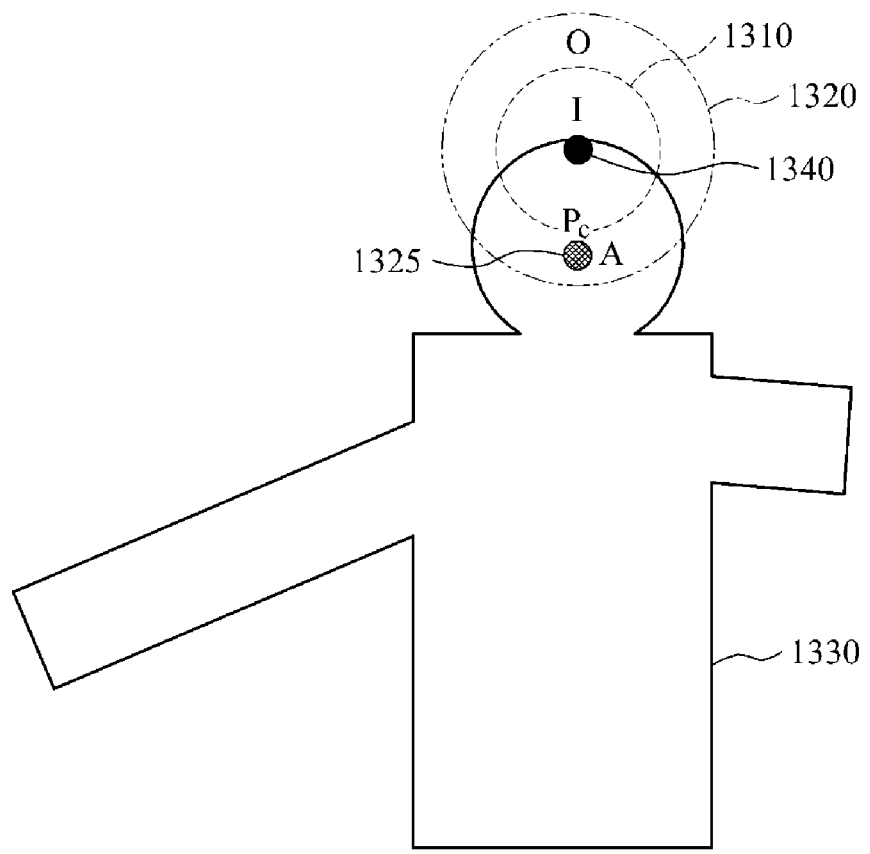

FIGS. 11 through 13 illustrate principles of a method of detecting a user input according to example embodiments.

Referring to FIG. 11, when a first region 1110 and a second region 1120 are disposed around a hand of a user 1130 as a center, depths of many points included in the first region 1110 may be less than a depth of point A 1125 having a minimum depth in the second region 1120. Thus, a central point $P_c$ 1140 may be selected to be an interfacing region.

Referring to FIG. 12, when a first region 1210 and a second region 1220 are disposed around an arm of a user 1230 as a center, depths of many points included in the first region 1210 may be greater than a depth of point A 1225 having a minimum depth in the second region 1220. Thus, a central point $P_c$ 1240 may not be selected to be an interfacing region.

Referring to FIG. 13, when a first region 1310 and a second region 1320 are disposed around a head of a user 1330 as a center, depths of points included in the first region 1310 may be greater than a depth of point A 1325 having a minimum depth in the second region 1320. Thus, a central point $P_c$ 1340 may not be selected to be an interfacing region.

For example, when the first region 1310 and the second region 1320 are disposed around a forehead of the user 1330 as a center, the point A 1325 having a minimum depth in the second region 1320 may be a point corresponding to a nose of the user 1330. In this instance, because the depths of all points included in the first region 1310 may be greater than the depth of point A 1325, the central point $P_c$ 1340 may not be selected to be the interfacing region.

Although not shown in drawings, when a first region and a second region are disposed around a nose of a user as a center, a central point may not be selected to be an interfacing region.

In particular, because a size of the first region is set to fit the size of the hand of the user, the size of the first region may be smaller than a size of a head region of the user. Because the size of the first region is smaller than the size of the head region of the user, a point having a minimum depth in the second region may be included in the head region of the user. In this instance, a difference between depths of the points included in the first region and the minimum depth of the second region may be less than or equal to a threshold depth. To this end, the threshold depth may be set to be greater than a height of the nose of the user. Accordingly, when the first region and the second region are disposed around the nose of the user as a center, the central point may not be selected to be the interfacing region.

Figure 14:
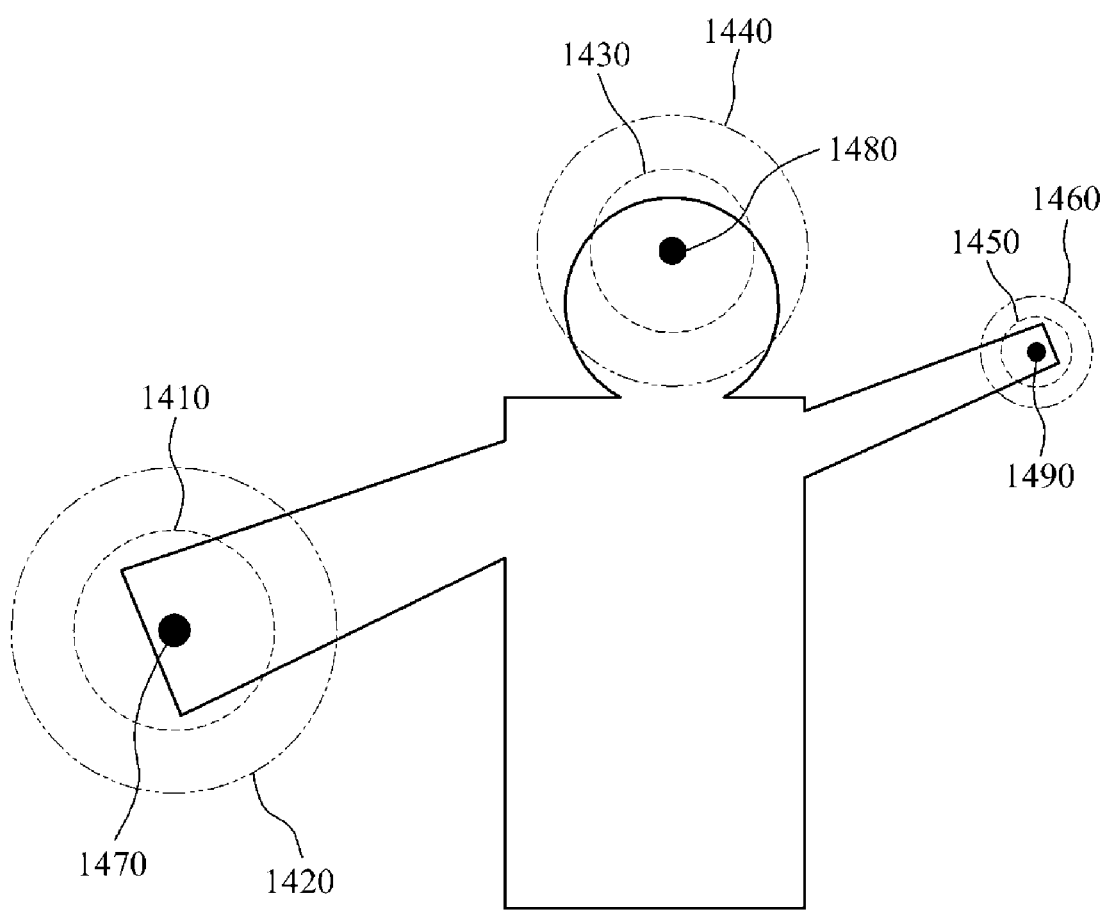
FIG. 14 illustrates a method of controlling a size of a first region and a size of a second region according to example embodiments.

FIG. 14 illustrates a method of controlling a size of a first region and a size of a second region according to example embodiments.

Referring to FIG. 14, an apparatus for detecting a user input according to example embodiments may adjust a size of a first region and a size of a second region based on a location of the first region and a location of the second region, respectively.

The size of the first region may be set to fit a size of hands of the user. However, the size of the hands included in the depth image may vary due to a perspective corresponding to a distance from an image sensor.

For example, a right hand of the user may be located closer to the image sensor in comparison to a left hand of the user. In this instance, the actual size of hands of the user may be fixed. However, an image of the right hand may be larger than an image of the left hand because the right hand is located closer to the image sensor in comparison to the left hand.

In practice, an actual size of the right hand may be equal to an actual size of the left hand. However, in the depth image captured using the image sensor, the right hand may look larger than the left hand due to the perspective.

The apparatus for detecting a user input may adjust the size of the first region based on the size of hands varying due to the perspective. The apparatus for detecting a user input may obtain a depth of a central point of the first region and the second region. Thus, the apparatus for detecting a user input may predict a change in a size resulting from the perspective using the obtained depth, thereby controlling the size of the first region and the size of the second region.

For example, the apparatus for detecting a user input may detect a first point 1470, a second point 1480, and a third point 1490 to be end-points. The first point 1470 may have a minimum depth, the third point 1490 may have a maximum depth, and the second point 1480 may have a relatively moderate depth compared to the maximum and minimum depths.

The apparatus for detecting a user input may set a size of a first region 1410 and a size of a second region 1420 disposed based on the first point 1470 to be maximized. The apparatus for detecting a user input may set a size of a first region 1450 and a size of a second region 1460 disposed based on the third point 1490 to be minimized. The apparatus for detecting a user input may set a size of a first region 1430 and a size of a second region 1440 disposed based on the second point 1480 to be interposed between the minimized size and the maximized size.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of detecting a user input, the method comprising:
   obtaining a depth of a first region in a depth image;
   obtaining a depth of a second region in the depth image, wherein the second region surrounds the first region;
   comparing the depth of the first region to the depth of the second region; and
   classifying, by a processor, at least one point included in the first region as an interfacing region in response that the depth of the first region is less than the depth of the second region by at least a threshold.

2. The method of claim 1, wherein the depth of the first region is calculated using points corresponding to an object included in the depth image among a plurality of points included in the first region, and the depth of the second region is calculated using points corresponding to the object among a plurality of points included in the second region.

3. The method of claim 1, wherein the depth of the second region comprises a minimum depth among depths of a plurality of points included in the second region.

4. The method of claim 1, wherein the classifying comprises determining whether a ratio of points, among a plurality of points included in the first region, having depths less than the depth of the second region by at least a threshold depth difference to the plurality of points included in the first region is greater than a threshold ratio.

5. The method of claim 1, wherein the classifying comprises classifying a central point of the first region as the interfacing region.

6. The method of claim 1,
   wherein the second region comprises a boundary line of the first region.

7. The method of claim 1, further comprising:
   sensing a user input using the interfacing region.

8. The method of claim 1, further comprising:
   selecting one of a plurality of points included in the depth image; and
   setting the first region and the second region at the selected point.

9. The method of claim 8, wherein the setting comprises determining at least one of a size of the first region and a size of the second region based on a depth of the selected point.

10. The method of claim 1, further comprising:
    detecting an end-point of an object included in the depth image; and
    setting the first region and the second region at the detected end-point.

11. The method of claim 10, wherein the detecting comprises:
    calculating a center of the object included in the depth image;
    calculating distance information among a plurality of points included in the object based on the center of the object; and
    detecting the end-point based on the distance information.

12. The method of claim 11, wherein the calculating of the center of the object comprises calculating depth centers of the plurality of points included in the object.

13. The method of claim 10, wherein the setting comprises determining at least one of a size of the first region and a size of the second region based on a depth of the end-point.

14. A non-transitory computer-readable medium comprising a program for instructing a computer to perform the method of claim 1.

15. The method of claim 1, wherein the second region covering the first region includes the second region completely surrounding the first region.

16. The method of claim 1, wherein the second region completely surrounding the first region includes the second region sharing a boundary with the first region.

17. The method of claim 1, wherein a size of the first region is set to fit a size of a hand of the user.

18. An apparatus for detecting a user input, the apparatus comprising:

a processor configured to:

obtain a depth of a first region in a depth image, obtain a depth of a second region in the depth image, wherein the second region surrounds the first region, compare the depth of the first region to the depth of the second region; and classify at least one point included in the first region as an interfacing region in response that the depth of the first region is less than the depth of the second region by at least a threshold.

19. The apparatus of claim 18, wherein the processor comprises:

a determiner to determine whether a ratio of points, among a plurality of points included in the first region, having depths less than the depth of the second region by at least a threshold depth difference to the plurality of points included in the first region is greater than a threshold ratio.

20. The apparatus of claim 18, further comprising:

a selector to select one of a plurality of points included in the depth image; and a setting unit to set the first region and the second region at the selected point.

21. The apparatus of claim 18, further comprising:

a detector to detect an end-point of the object included in the depth image; and a setting unit to set the first region and the second region at the detected end-point.

22. The apparatus of claim 21, wherein the detector comprises:

a center calculator to calculate a center of the object included in the depth image;

a distance information calculator to calculate distance information among a plurality of points included in the object based on the center of the object; and an end-point detector to detect the end-point based on the distance information.

* * * * *